United States Patent
Yu et al.

(10) Patent No.: US 9,819,640 B2
(45) Date of Patent: Nov. 14, 2017

(54) METHOD FOR KEEPING REMOTE CONNECTION, ELECTRONIC DEVICE AND SERVER

(71) Applicant: Acer Incorporated, New Taipei (TW)

(72) Inventors: Shih-Hsien Yu, New Taipei (TW); Yu-Ren Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 188 days.

(21) Appl. No.: 14/710,598

(22) Filed: May 13, 2015

(65) Prior Publication Data

US 2016/0127308 A1    May 5, 2016

(30) Foreign Application Priority Data

Oct. 31, 2014 (TW) .............................. 103137838 A

(51) Int. Cl.
| | |
|---|---|
| *H04L 29/12* | (2006.01) |
| *H04L 29/08* | (2006.01) |
| *H04W 52/02* | (2009.01) |
| *H04W 40/00* | (2009.01) |
| *H04W 76/04* | (2009.01) |
| *H04L 12/751* | (2013.01) |
| *H04L 12/703* | (2013.01) |

(52) U.S. Cl.
CPC ......... *H04L 61/2007* (2013.01); *H04L 67/10* (2013.01); *H04W 52/0235* (2013.01); *H04L 45/026* (2013.01); *H04L 45/28* (2013.01); *H04W 40/005* (2013.01); *H04W 52/0241* (2013.01); *H04W 76/048* (2013.01); *Y02B 60/50* (2013.01)

(58) Field of Classification Search
CPC ... H04L 45/026; H04L 45/28; H04L 61/2007; H04L 67/10; H04W 40/005; H04W 52/0235; H04W 52/0241; H04W 76/048; Y02B 60/50
USPC ................................................ 709/219, 224
See application file for complete search history.

(56) References Cited

U.S. PATENT DOCUMENTS

| | | | | |
|---|---|---|---|---|
| 7,788,674 | B1 * | 8/2010 | Siegenfeld | G06F 9/54 709/201 |
| 9,424,215 | B2 * | 8/2016 | Hickey | G06F 13/385 |
| 9,516,116 | B2 * | 12/2016 | Santamaria | G06F 9/4418 |
| 9,537,392 | B1 * | 1/2017 | Kozhumam | H02M 3/156 |
| 2003/0088698 | A1 * | 5/2003 | Singh | H04L 12/4641 709/239 |
| 2004/0013099 | A1 * | 1/2004 | O'Neill | H04L 12/4633 370/338 |
| 2004/0068666 | A1 * | 4/2004 | Tosey | H04L 12/5895 726/4 |

(Continued)

*Primary Examiner* — Alina N Boutah
(74) *Attorney, Agent, or Firm* — JCIPRNET

(57) ABSTRACT

A method for keeping remote connection, an electronic device, and a server are provided. After establishing a first network connection, the electronic device enters a power-saving state from an operation state. While operating in the power-saving state, a communication module of the electronic device continuously detects a keep-alive packet transmitted by the server via the first network connection. If an error of reception of the keep-alive packet occurs, the electronic device returns to the operation state from the power-saving state in response to a wake-up signal, so as to re-establish a second network connection between the electronic device and the server.

13 Claims, 4 Drawing Sheets

10

(56) References Cited

U.S. PATENT DOCUMENTS

| | | | |
|---|---|---|---|
| 2007/0239875 A1* | 10/2007 | Sood | H04L 63/20 709/228 |
| 2008/0101445 A1* | 5/2008 | Ho | H04L 29/12216 375/222 |
| 2008/0154913 A1* | 6/2008 | Kohonen | H04W 76/045 |
| 2009/0017810 A1* | 1/2009 | Harsch | H04W 76/045 455/418 |
| 2009/0092049 A1* | 4/2009 | Hargrave | H04L 12/66 370/235 |
| 2009/0271517 A1 | 10/2009 | Naylor et al. | |
| 2010/0039971 A1* | 2/2010 | Lor | H04W 52/0274 370/311 |
| 2010/0205467 A1* | 8/2010 | Park | G06F 1/3203 713/320 |
| 2010/0208724 A1* | 8/2010 | Booth | H04L 12/66 370/352 |
| 2012/0106423 A1* | 5/2012 | Nylander | H04W 52/0241 370/311 |
| 2012/0173645 A1* | 7/2012 | Marcellino | H04L 12/587 709/206 |
| 2012/0185726 A1* | 7/2012 | Duron | G06F 11/2028 714/11 |
| 2012/0233478 A1 | 9/2012 | Mucignat et al. | |
| 2013/0007484 A1* | 1/2013 | Gobriel | G06F 1/3209 713/320 |
| 2013/0044658 A1* | 2/2013 | Zhu | H04W 52/0229 370/311 |
| 2013/0067060 A1* | 3/2013 | Thaler | G06F 1/3209 709/224 |
| 2013/0089015 A1* | 4/2013 | Choong | H04W 52/0216 370/311 |
| 2013/0124618 A1* | 5/2013 | Zhong | H04W 12/06 709/203 |
| 2013/0331091 A1* | 12/2013 | Chang | H04W 52/0229 455/423 |
| 2014/0003372 A1* | 1/2014 | Qian | H04W 8/22 370/329 |
| 2014/0051485 A1* | 2/2014 | Wang | H04B 7/2656 455/574 |
| 2014/0089503 A1* | 3/2014 | Thyni | H04L 41/0668 709/224 |
| 2014/0098727 A1* | 4/2014 | Murabito | H04W 52/0277 370/311 |
| 2015/0095648 A1* | 4/2015 | Nix | H04W 52/0235 713/170 |
| 2015/0200802 A1* | 7/2015 | Sawal | H04L 45/22 370/228 |
| 2015/0282177 A1* | 10/2015 | Dong | H04L 43/0811 370/329 |
| 2015/0382302 A1* | 12/2015 | Davis | H04W 52/0235 370/311 |

* cited by examiner

METHOD FOR KEEPING REMOTE CONNECTION, ELECTRONIC DEVICE AND SERVER

CROSS-REFERENCE TO RELATED APPLICATION

This application claims the priority benefit of Taiwan application serial no. 103137838, filed on Oct. 31, 2014. The entirety of the above-mentioned patent application is hereby incorporated by reference herein and made a part of this specification.

BACKGROUND OF THE INVENTION

Field of the Invention

The invention relates to a remote control technique through a network and more particularly relates to a method for keeping remote connection, an electronic device, and a server.

Description of Related Art

The cloud technology utilizes the Internet and its fast computing capability and huge storage capacity to enable electronic devices, e.g. personal computers, tablets, and smart phones, having limited computing capability and storage capacity to access computing resources, storage resources or services remotely through the Internet. In order that the user can access the computing resources, storage resources or services remotely anywhere and anytime, the electronic device in the cloud system is in the always on always connected (AOAC) or connected standby mode, so as to be prepared for a data access request sent by the cloud system. Considering energy and power saving, however, the electronic device in the cloud system may have a variety of power management modes, which allow the electronic device to enter the sleep state or shutdown state when the user requests no data or service.

WAKE-on-LAN (WOL) is one of the services achieved using the cloud network and makes it possible to send a wake-up command to the electronic device that has entered the sleep state or shutdown state through a server (also called a cloud host) at another end of the network. The electronic device may restore to an operation state from the sleep state or change from the shutdown state to a power-on state in response to the wake-up command sent by the server for the user to control the electronic device remotely.

In order to maintain the remote wake-up function at all times, the electronic device keeps connecting with the server through a communication module. Nevertheless, after the electronic device enters the power-saving state, if the network environment changes or the network configuration of the connection changes, the server would not be able to maintain remote connection with the electronic device. As a result, the user cannot wake up the electronic device instantly. For example, if the dynamic Internet protocol address of the electronic device changes, the server would not be able to reach the electronic device at the previous IP address until the electronic device is activated and re-establishes the connection.

SUMMARY OF THE INVENTION

The invention provides a method for keeping remote connection, an electronic device, and a server for quickly detecting an error of network connection or disconnection between the electronic device in a power-saving state and the server, so as to instantly wake up the electronic device to re-establish the network connection with the server.

The invention provides a method for keeping remote connection, adapted for an electronic device with a communication module. The electronic device is connected to a network through the communication module, and the method includes the following. After establishing a first network connection between the electronic device and a server, the electronic device enters a power-saving state from an operation state. A keep-alive packet sent by the server through the first network connection is continuously detected during a period of operating in the power-saving state. If an error of reception of the keep-alive packet occurs, the electronic device returns to the operation state from the power-saving state in response to a wake-up signal to re-establish a second network connection between the electronic device and the server.

The invention provides an electronic device, which includes a communication module and a processing unit. The communication module is configured for connecting to a network, and the processing unit is coupled to the communication module. After the communication module establishes a first network connection between the electronic device and the server, the processing unit controls the electronic device to enter a power-saving state from an operation state. During a period that the electronic device operates in the power-saving state, the communication module continuously detects a keep-alive packet sent by the server through the first network connection. If an error of reception of the keep-alive packet occurs, the processing unit controls the electronic device to return to the operation state from the power-saving state in response to a wake-up signal sent by the communication module, and the processing unit controls the communication module to re-establish a second network connection between the electronic device and the server.

The invention provides a server, which includes a communication module and a processing unit coupled to the communication module. The processing unit controls the communication module to establish a first network connection between the server and the electronic device. After the electronic device enters a power-saving state, the processing unit controls the communication module to continuously send a keep-alive packet to the electronic device through the first network connection.

Based on the above, before the electronic device enters the power-saving state, the electronic device and the server establish network connection based on the current first Internet protocol address, such that the server can continuously send the keep-alive packet to the electronic device in the power-saving state. If the network connection based on the first Internet protocol address is disconnected, due to an error of reception of the keep-alive packet, the communication module of the electronic device sends the wake-up signal to the processing unit. Then the processing unit control the electronic device to return to the operation state from the power-saving state. The electronic device returns to the operation state from the power-saving state to re-establish the connection with the server based on the new second Internet protocol address. Accordingly, the electronic device in the power-saving state is able to quickly detect whether there is an error in the connection with the server and instantly re-establish new connection, so as to keep the electronic device and the server connected at all times.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
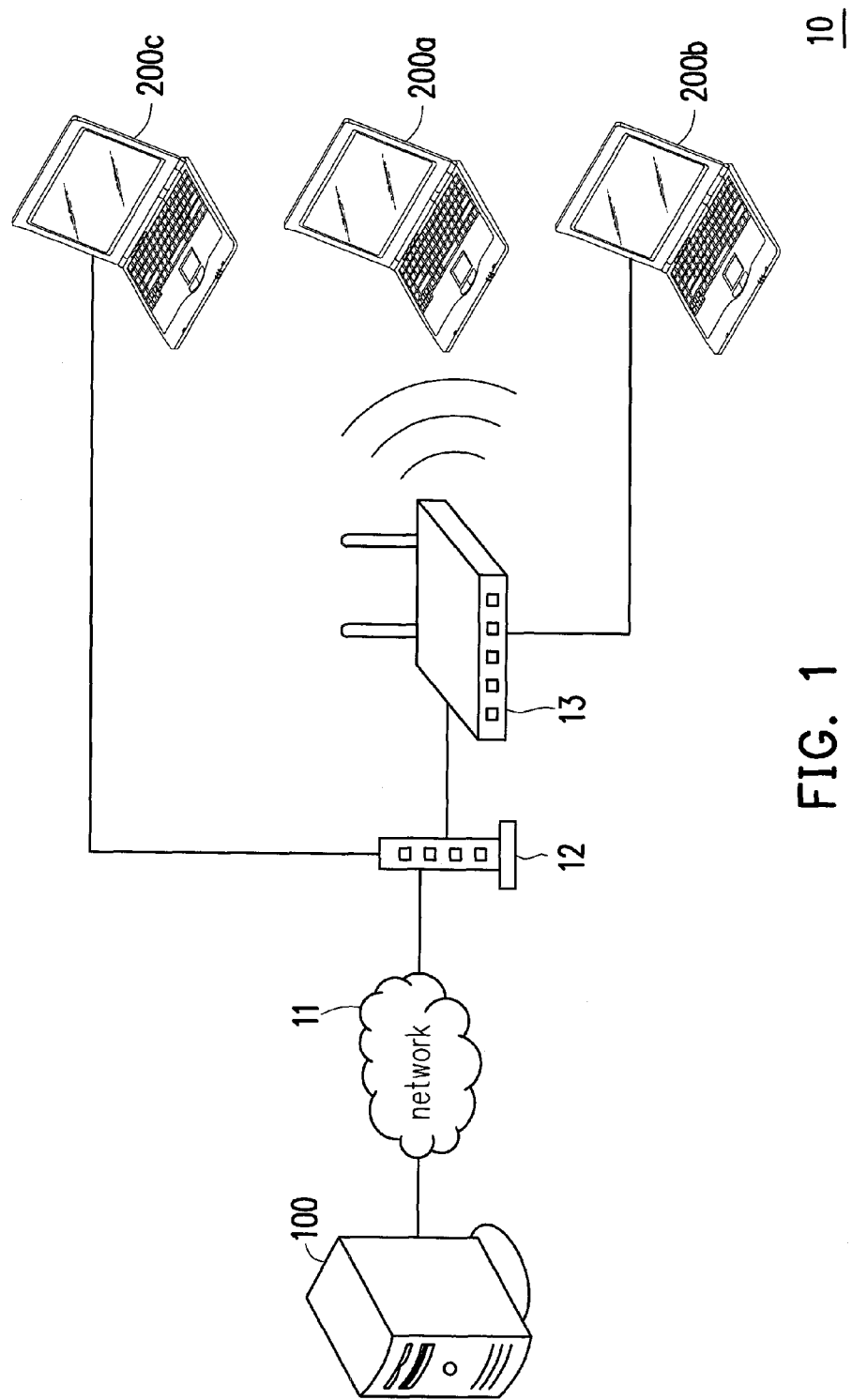
FIG. 1 is a schematic diagram illustrating a remote control system according to an embodiment of the invention.

FIG. 1 is a schematic diagram illustrating a remote control system according to an embodiment of the invention. With reference to FIG. 1, a remote control system 10 includes a server 100 and electronic devices 200a, 200b, and 200c. The electronic devices 200a, 200b, and 200c have a network connection function and are remotely controllable. The electronic devices 200a, 200b, and 200c may be a desktop computer, a laptop computer, a tablet computer that can be linked to a network, or a corresponding mobile electronic device owned by the user. In this embodiment, the electronic devices 200a, 200b, and 200c may connect to a network 11 to communicate with the server 100 through the network 11 in a normal operation mode.

Moreover, the server 100 may send a wake-up command through the network 11 to the electronic devices 200a, 200b, and 200c which are in a power-saving state according to the user's operation, so as to complete a network wake-up function. Specifically, the electronic devices 200a, 200b, and 200c may return to an operation state from a sleep state or change from a shutdown state to a power-on state in response to the wake-up command sent by the server 100, such that the user may control the electronic devices 200a, 200b, and 200c remotely. The server 100 may be a cloud server connected to the network 11 or a server group formed by a plurality of physical equipment through cloud hardware sharing technology. A variety of hardware equipment of the server 100 is available. Thus, the invention is not intended to limit the type of the hardware equipment.

It should be mentioned that the remotely-controllable electronic device may be connected to the network 11 by different connection methods. As shown in FIG. 1, the electronic devices 200a, 200b, and 200c are basically connected to the network 11 through a modem 12. The modem 12 may be an Asymmetric Digital Subscriber Line modem (ADSL modem) or a cable modem, for example. However, it should be noted that the invention is not intended to limit the type of the modem 12. As shown in FIG. 1, the electronic device 200c may directly connect to the modem 12 in a wired or wireless manner to connect to the network 11. Moreover, an Internet protocol router 13 is connected with the modem 12, and the electronic devices 200a and 200b may be connected to the Internet protocol router 13 in a wired or wireless manner to be connected to the network 11. The Internet protocol router 13 may be a network device, such as a wireless access point (AP) or an indoor router, for example. However, the invention is not limited thereto. Nevertheless, it should be noted that FIG. 1 merely illustrates an example of the network connection of the remote control system 10, and thus should not be construed as a limitation to the invention.

Figure 2:
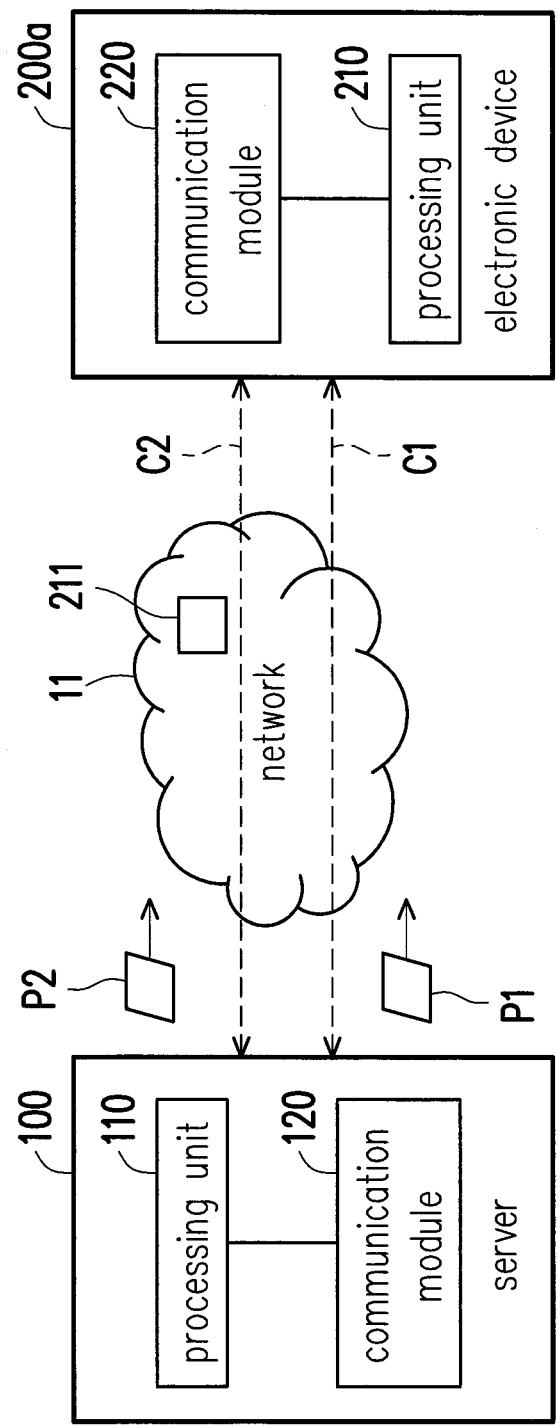
FIG. 2 is a functional diagram illustrating an electronic device and a server according to an embodiment of the invention.

FIG. 2 is a functional diagram illustrating an electronic device and a server according to an embodiment of the invention. The following descriptions are provided based on the electronic device 200a of FIG. 1 as an example. It should be noted that the invention is not limited thereto. The electronic devices 200b and 200c have hardware apparatuses and remote control function the same as or similar to those of the electronic device 200a. With reference to FIG. 2, the server 100 includes a processing unit 110 and a communication module 120. The electronic device 200a includes a processing unit 210 and a communication module 220. The processing unit 110 of the server 100 is coupled to the communication module 120 of the server 100, and the processing unit 210 of the electronic device 200a is coupled to the communication module 220 of the electronic device 200a.

The processing units 110 and 210 may be a central processing unit (CPU), a programmable microprocessor, a digital signal processor (DSP), a programmable controller, an application specific integrated circuit (ASIC), a programmable logic device (PLD), or other hardware devices with computing capability, for example.

The communication module 120 and the communication module 220 provide a function of network connection, which connects the electronic device 200a and the server 100 to the network 11. The communication module 120 and the communication module 220 may be implemented by software, hardware, or a combination of the foregoing. However, the invention is not limited thereto. The software may be a source code, application software, driver program, or a software module or function specialized for achieving a specific function, for example. The hardware may be a programmable controller, a digital signal processor (DSP), or other programmable microprocessors for general use or specific use, for example. However, the invention is not limited thereto. For example, the communication module 220 of the electronic device 200a may be a physical Ethernet card and/or a wireless network card and a network chip used therein.

It should be noted that, in this embodiment, the communication module 220 is configured to establish a network model low layer connection with the server 100 through the network 11, wherein the network model low layer connection may include physical layer connection and data link layer connection. More specifically, the network model low layer connection between the electronic device 200a and the server 100 is established by the communication module 220. The network model high layer connection between the electronic device 200a and the server 100, e.g. network layer connection, transport layer connection, session layer connection, presentation layer connection, and application layer connection, is established by the processing unit 210.

Accordingly, after the connection between the electronic device 200a and the server 100 is established, the electronic device 200a can communicate with the server 100 through the network 11. The electronic device 200a may enter the power-saving state and stop supplying power to the processing unit 210, so as to reduce power consumption of the electronic device 200a. When the electronic device 200a is in the power-saving state, the communication module 120 remains operating normally to maintain the network model low layer connection with the server 100. Thus, the server 100 can wake up the electronic device 200a in the power-saving state through the network model low layer connection between the electronic device 200a and the server 100 to achieve the network wake-up function. The power-saving state of the electronic device may be a standby state, a sleep state, a connection standby state, or a shutdown state. For example, the power-saving state is a S3 state (sleep state) defined according to the Advanced Configuration and Power Interface (ACPI) standard.

It is known that, once the network environment changes or connection parameters of the network connection change, the connection between the server 100 and the electronic device 200a in the power-saving state may be interrupted. For example, the communication module 220 of the electronic device 200a may obtain a dynamic IP address through the ADSL modem 12 and Point-to-Point Protocol over Ethernet (PPPoE) connection to be connected to the network 11, so as to maintain the network model low layer connection with the server 100 through the network 11. It should be noted that the Internet protocol router 13 or the modem 12 may obtain the dynamic IP address associated with the electronic device 200a through the PPPoE connection. Nevertheless, the invention is not limited thereto. In another exemplary embodiment, the communication module 220 of the electronic device 200a may obtain the dynamic IP address through the cable modem 12 and Dynamic Host Configuration Protocol (DHCP) connection to be connected to the network 11, so as to maintain the network model low layer connection with the server 100 through the network 11.

If an Internet service provider (ISP) 211 that assigns the dynamic address changes the dynamic IP configuration due to a routing policy or other factors, the electronic device 200a would be disconnected from the network 11. In that case, the Internet protocol router 13 or the modem 12 may try to reconnect to the network 11 and obtain a new dynamic IP through the PPPoE connection, for example. Since the electronic device 200a is in the power-saving state, the electronic device 200a cannot detect that the dynamic IP has been reconfigured, and thus the server 100 cannot maintain the connection with the electronic device 200a with the previous dynamic IP.

Therefore, in this embodiment, after the electronic device 200a enters the power-saving state, the server 100 continuously sends a keep-alive packet P1 to the communication module 220 of the electronic device 200a through a first network connection C1 that has been established, and the communication module 220 also continuously detects the keep-alive packet P1. If the communication module 220 determines that an error or problem in receiving the keep-alive packet P1 occurs, the communication module 220 sends a wake-up signal to the processing unit 210, such that the electronic device 200a returns to the operation state from the power-saving state to re-establish a second network connection C2 with the server 100. After the second network connection C2 is established, the processing unit 210 may control the electronic device 200a to enter the power-saving state again and continuously detect a keep-alive packet P2 sent by the server 100 through the second network connection C2. Although FIG. 2 illustrates the example of using the electronic device 200a, the electronic devices 200b and 200c may maintain connection with the server 100 by the same method. Thus, details thereof are not repeated hereinafter.

It is known from the above that, in this embodiment, if the connection between the server 100 and the electronic device 200a disappears or has a problem, the electronic device 200a can instantly change from the power-saving state to the operation state to re-establish the connection, so as to maintain the connection between the server 100 and the electronic device 200a in the power-saving state.

Figure 3:
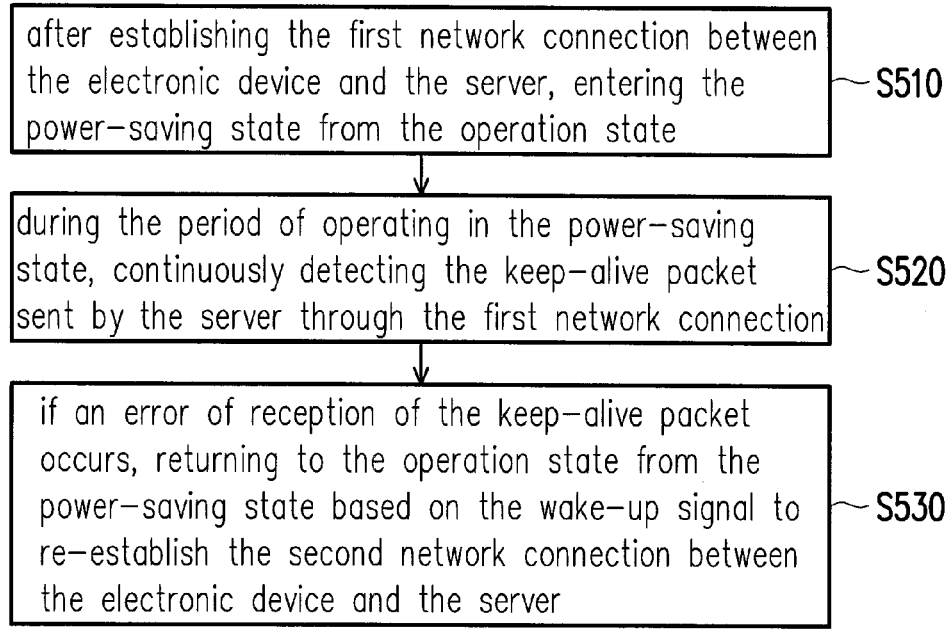
FIG. 3 is a flowchart illustrating a method for keeping remote connection of the electronic device according to an embodiment of the invention.

Exemplary embodiments are given below to explain in detail how to maintain the connection between the electronic device 200a and the server 100 with the keep-alive packet sent by the server 100 in the invention. FIG. 3 is a flowchart illustrating a method for keeping remote connection of the electronic device according to an embodiment of the invention. With reference to FIG. 3, the method of this embodiment is applicable to the electronic device 200a of FIG. 2. Below, steps of the method for keeping remote connection of the invention are explained in detail with reference to components of the electronic device 200a.

It should be noted that, when the electronic device 200a is to enter the power-saving state, the electronic device 200a is already connected to the network 11 and obtains a first Internet protocol address that is a dynamic address assigned by an ISP. The electronic device 200a sets network configuration of the first network connection C1 with the server 100 according to the first Internet protocol address to establish the first network connection C1 between the electronic device 200a and the server 100.

In Step S510, after the communication module 210 establishes the first network connection C1 between the electronic device 200a and the server 100, the processing unit 220 controls the electronic device 200a to enter the power-saving state from the operation state. It is known that the first network connection C1 is established based on the first Internet protocol address.

Next, in Step S520, during a period that the electronic device 200a operates in the power-saving state, the communication module 210 continuously detects the keep-alive packet P1 sent by the server 100 through the first network connection C1. More specifically, the communication module 210 is still able to continuously receive the keep-alive packet and detect whether an error of reception of the keep-alive packet occurs even when the electronic device 200a enters the power-saving state.

Thereafter, in Step S530, if an error of reception of the keep-alive packet P1 occurs, the processing unit 210 controls the electronic device 200a to return to the operation state from the power-saving state in response to the wake-up signal sent by the communication module 220, so as to re-establish the second network connection C2 between the electronic device 200a and the server 100. The error of reception of the keep-alive packet P1 includes a condition of not receiving the keep-alive packet P1 within a predetermined time. The keep-alive packet P1 conforms to a pre-defined packet pattern set by the electronic device 200a. For example, if the communication module 220 has waited over 2 minutes and determines that the keep-alive packet P1 conforming to the packet pattern or having correct packet content is not received, the communication module 220 determines that an error of reception of the keep-alive packet P1 occurs accordingly. It should be noted that, in an embodiment, a criterion (e.g. predetermined waiting time) for the communication module 220 to determine whether an error of reception of the keep-alive packet P1 occurs may be determined based on a frequency and a time interval at which the server 100 sends the keep-alive packet P1.

More specifically, the keep-alive packet may be implemented by a magic packet that is recognized by a network wake-up protocol and has a fixed specification. However, the aforementioned keep-alive packet may be implemented by other packet patterns that have another specification or self-defined packet patterns. In an embodiment, the electronic device 200a may define the predetermined packet pattern (e.g. packet style, packet content, or packet encryption form) of the keep-alive packet by itself and notify the server 100 of the predetermined packet pattern corresponding to the keep-alive packet. Accordingly, the electronic device 200a and the server 100 achieve the method for keeping remote connection of the invention by using the specific predetermined packet pattern.

Simply put, if the communication module 220 does not receive the keep-alive packet P1 with the correct packet pattern at/content for a long period of time, the communication module 220 sends the wake-up signal to the processing unit 210, so as to cause the processing unit 210 to wake up and change to the operation state to re-establish the second network connection C2. Accordingly, the connection between the server 100 and the electronic device 200a is kept alive.

It should be noted that, in an embodiment, the keep-alive packet P1 may not be successfully transmitted to the electronic device 200a because the Internet service provider 211 assigns a new second Internet protocol address to the electronic device 200a. That is to say, the server 100 is unaware of the change of the dynamic IP corresponding to the electronic device 200a and is unable to transmit the keep-alive packet P1 to the electronic device 200a through the first network connection C1 based on the first Internet protocol address. As a result, the communication module 220 cannot continuously receive the keep-alive packet P1. Based on the above, the communication module 220 determines that an error of reception of the keep-alive packet P1 occurs and sends the wake-up signal to the processing unit 210 to cause the processing unit 210 to change to the operation state and use the new second Internet protocol address to perform setting of the second network connection C2 with the server 100.

Figure 4:
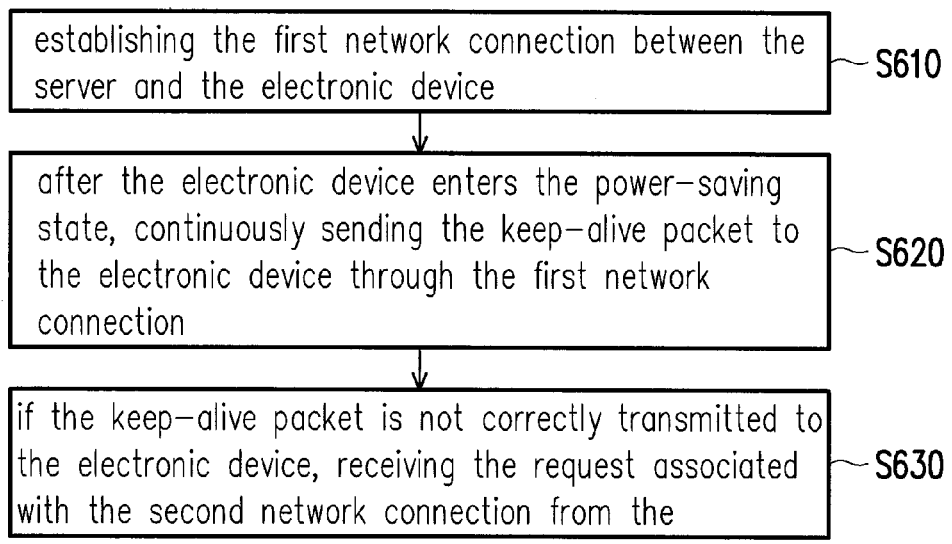
FIG. 4 is a flowchart illustrating a method for keeping remote connection of the server according to an embodiment of the invention.

FIG. 4 is a flowchart illustrating a method for keeping remote connection of the server according to an embodiment of the invention. With reference to FIG. 4, the method of this embodiment is applicable to the server 100 of FIG. 2. Below, steps of the method for keeping remote connection of the invention are explained in detail with reference to components of the server 100.

First, in Step S610, the processing unit 110 of the server 100 controls the communication module 120 to establish the first network connection C1 between the server 100 and the electronic device 200a. Specifically, before the electronic device 200a enters the power-saving state, the server 100 may receive a connection establishment request of the electronic device 200a and respond to the electronic device 200a with a connection establishment response, so as to perform setting of the first network connection C1 with the electronic device 200a.

Next, in Step S620, after the electronic device 200a enters the power-saving state, the processing unit 110 controls the communication module 120 to continuously send the keep-alive packet P1 to the electronic device 200a through the first network connection C1. To be more specific, based on the establishment of the first network connection C1, the processing unit 110 of the server 100 continuously sends the keep-alive packet P1 to the communication module 220 of the electronic device 200a based on the first Internet protocol address corresponding to the electronic device 200a. The invention is not intended to limit whether the keep-alive packet P1 is sent regularly or irregularly.

For example, the server 100 sends one keep-alive packet P1 to the electronic device 200a at a fixed time interval (e.g. 30 seconds). That is, the frequency and time interval at which the server 100 sends the keep-alive packet may be designed according to the actual conditions. The invention is not intended to limit the frequency or the time interval. Moreover, the content of the keep-alive packet P1 may be encrypted or specially processed to increase security of the invention.

In Step S630, if the keep-alive packet P1 is not correctly transmitted to the electronic device 200a, the processing unit 110 uses the communication module 120 to receive the connection establishment request associated with the second network connection C2 from the electronic device 200a, so as to re-establish the second network connection C2 between the server 100 and the electronic device 200a. The second network connection C2 is established based on the second Internet protocol address. More specifically, the processing unit 110 updates the first Internet protocol address associated with the electronic device 200a to the second Internet protocol address, so as to continuously send the keep-alive packet P2 to the electronic device 200a that enters the power-saving state again through the second network connection C2 based on the second Internet protocol address.

Figure 5:
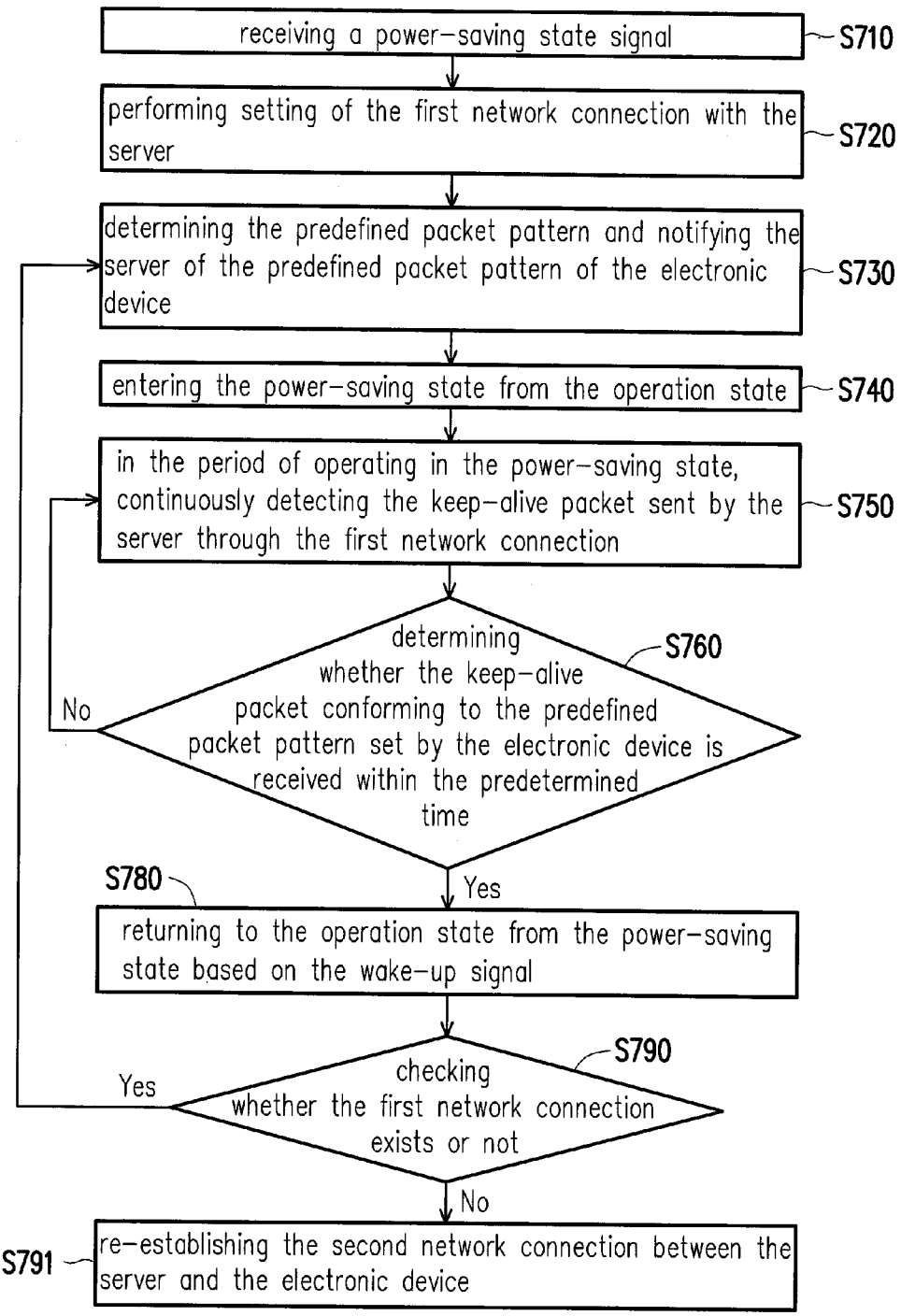
FIG. 5 is a flowchart illustrating a method for keeping remote connection of the electronic device according to an embodiment of the invention.

FIG. 5 is a flowchart illustrating a method for keeping remote connection of the electronic device according to an embodiment of the invention. With reference to FIG. 5, the method of this embodiment is applicable to the electronic device 200a of FIG. 2. Below, steps of the method for keeping remote connection of the invention are explained in detail with reference to components of the electronic device 200a.

First, in Step S710, the processing unit 210 receives a power-saving state signal. For example, the processing unit 210 may receive the power-saving state signal based on a sleep command given by the user and prepare to enter the power-saving state. Alternatively, the processing unit 210 may receive a power-saving state signal sent by an internal timing unit if not receiving any operation from the outside for a long period of time and accordingly prepare to enter the power-saving state.

Before the electronic device 200a enters the power-saving state, in Step S720, the processing unit 210 controls the communication module 220 to perform setting of the first network connection C1 with the server 100. In Step S730, the processing unit determines the predefined packet pattern and notifies the server 100 of the predefined packet pattern of the electronic device 200a. Accordingly, the server 100 generates and transmits the keep-alive packet P1 according to the predefined packet pattern set by the electronic device 200a. In Step S740, the processing unit 210 controls the electronic device 200a to enter the power-saving state from the operation state. In Step S750, the communication module 220 continuously detects the keep-alive packet P1 sent by the server 100 through the first network connection C1. In Step S760, the communication module 220 determines whether the keep-alive packet P1 conforming to the predefined packet pattern set by the electronic device 200a is not received when the predetermined time expires. If the result of Step S760 is YES, Step S780 is performed such that the processing unit 210 returns to the operation state from the power-saving state in response to the wake-up signal. In other words, when the communication module 220 determines that an error of reception of the keep-alive packet P1 occurs, the communication module 220 sends the wake-up signal to wake up the processing unit 210 of the electronic device 200*a*. For example, it is given that the predetermined time for determining whether an error of reception of the keep-alive packet occurs is 120 seconds. If the communication module 220 does not receive any packet in 120 seconds after the counting starts, the communication module 220 determines that an error of reception of the keep-alive packet occurs and wakes up the processing unit 210.

In addition, in other embodiments, it is given that the predetermined time for determining whether an error of reception of the keep-alive packet occurs is 120 seconds. Although the communication module 220 receives a packet in 30 seconds after the counting starts, the received packet does not conform to the predefined packet pattern. Therefore, the communication module 220 continuously detects and determines whether the keep-alive packet that conforms to the predefined packet pattern set by the electronic device 200*a* is received in the remaining 90 seconds. If the communication module 220 receives the keep-alive packet P1 conforming to the form in the remaining 90 seconds, it means that the first network connection C1 between the electronic device 200*a* and the server 10 still exists. On the contrary, if the communication module 220 does not receive the keep-alive packet P1 conforming to the form in the remaining 90 seconds, the communication module 220 determines that an error of reception of the keep-alive packet occurs and wakes up the processing unit 210.

Accordingly, if the result of Step S760 is NO, the procedure returns to Step S750. Simply put, if the communication module 220 continuously receives the correct keep-alive packet in the predetermined waiting time, the electronic device 200*a* is maintained in the power-saving state and continues to detect the keep-alive packet sent by the server through the first network connection.

Then, after the electronic device 200*a* returns to the operation state from the power-saving state based on the wake-up signal, in Step S790, the woken processing unit 210 checks if the first network connection C1 still exists. If the first network connection C1 exists (the result of Step S790 is YES), the procedure returns to Step S730. On the contrary, if the first network connection C1 does not exist (the result of Step S790 is NO), the processing unit 210 controls the communication module 220 to re-establish the second network connection C2 between the electronic device 200*a* and the server 100.

To sum up, in the embodiments of the invention, by detecting the keep-alive packet sent by the server, the communication module of the electronic device that is in the power-saving state instantly detects whether the network connection between the electronic device and the server still exists. If the network connection between the electronic device and the server no longer exists, the communication module of the electronic device sends the wake-up signal to the processing unit for the processing unit to control the electronic device to return to the operation state from the power-saving state and re-establish the connection with the server according to the current network connection environment and network connection parameters. Accordingly, the electronic device in the power-saving state is able to quickly detect whether there is an error in the connection with the server and instantly re-establish new connection, so as to keep the electronic device and the server connected at all times. For network wake-up application, a situation that the electronic device cannot be woken up due to disconnection between the electronic device and the server is avoided. In addition, the electronic device and the server can confirm and set the packet pattern of the keep-alive packet before entering the power-saving state, so as to detect whether the connection between the server and the electronic device exists by the keep-alive packet with device recognition or the encrypted keep-alive packet, thereby improving network security.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A remote connection keeping method for an electronic device comprising a communication module and connecting to a network through the communication module having a network chip, the remote connection keeping method comprising:

entering a power-saving state from an operation state by the electronic device after establishing a first network connection between the electronic device and a server;

continuously detecting a keep-alive packet sent from the server through the first network connection during a period of operating in the power-saving state; and returning to the operation state from the power-saving state in response to a wake-up signal to re-establish a second network connection between the electronic device and the server if an error of reception of the keep-alive packet occurs, wherein the wake-up signal is generated in response to the error of reception of the keep-alive packet occurs, wherein the error comprises a condition of not receiving the keep-alive packet that conforms to a predefined packet pattern set by the electronic device within a predetermined time, wherein the step of returning to the operation state from the power-saving state in response to the wake-up signal to re-establish the second network connection between the electronic device and the server if the error of reception of the keep-alive packet occurs comprises:

checking whether the first network connection exists after returning to the operation state from the power-saving state in response to the wake-up signal; and re-establishing the second network connection between the electronic device and the server if the first network connection does not exist.

2. The remote connection keeping method according to claim 1, wherein the first network connection is established based on a first Internet protocol address and the second network connection is established based on a second Internet protocol address, wherein the first Internet protocol address and the second Internet protocol address are dynamic addresses.

3. The remote connection keeping method according to claim 2, wherein an Internet service provider (ISP) assigns the first Internet protocol address and the second Internet protocol address, and the remote connection keeping method further comprises:

connecting to the network and obtaining the first Internet protocol address; and re-connecting to the network and obtaining the second Internet protocol address when internet connection with the network via the first Internet protocol address is disconnected.

4. The remote connection keeping method according to claim 1, wherein the step of entering the power-saving state from the operation state after establishing the first network connection between the electronic device and the server comprises:
   setting up network configuration of the first network connection with the server when receiving a power-saving state signal;
   determining the predefined packet pattern and notifying the server of the predefined packet pattern associated with the electronic device, such that the server send the keep-alive packet according to the predefined packet pattern; and
   entering the power-saving state from the operation state.

5. The remote connection keeping method according to claim 1, further comprising the following after the step of continuously sending the keep-alive packet to the electronic device through the first network connection:
   receiving a connection establishment request associated with the second network connection from the electronic device by the server to re-establish the second network connection between the server and the electronic device if the keep-alive packet is not correctly transmitted to the electronic device.

6. The remote connection keeping method according to claim 5, wherein the first network connection is established based on a first Internet protocol address and the second network connection is established based on a second Internet protocol address, wherein the first Internet protocol address and the second Internet protocol address are dynamic addresses assigned by the Internet service provider.

7. The remote connection keeping method according to claim 6, further comprising the following after the step of re-establishing the second network connection between the electronic device and the server:
   updating the first Internet protocol address associated with the electronic device to the second Internet protocol address, so as to continuously send the keep-alive packet to the electronic device through the second network connection by the server based on the second Internet protocol address.

8. An electronic device, comprising:
   a communication module configured for connecting to a network; and
   a processing unit coupled to the communication module having a network chip, wherein after the communication module establishes a first network connection between the electronic device and a server, the processing unit controls the electronic device to enter a power-saving state from an operation state,
   wherein during a period that the electronic device operates in the power-saving state, the communication module continuously detects a keep-alive packet sent from the server through the first network connection,
   wherein if an error of reception of the keep-alive packet occurs, the processing unit controls the electronic device to return to the operation state from the power-saving state in response to a wake-up signal sent by the communication module, and the processing unit controls the communication module to re-establish a second network connection between the electronic device and the server,
   wherein the wake-up signal is generated in response to the error of reception of the keep-alive packet occurs wherein the error comprises a condition of not receiving the keep-alive packet that conforms to a predefined packet pattern set by the electronic device when a predetermined time expires,
   wherein after the electronic device returns to the operation state from the power-saving state in response to the wake-up signal, the processing unit checks if the first network connection exists,
   wherein the processing unit controls the communication module to re-establish the second network connection between the electronic device and the server if the first network connection does not exist.

9. The electronic device according to claim 8, wherein the first network connection is established based on a first Internet protocol address and the second network connection is established based on a second Internet protocol address, wherein the first Internet protocol address and the second Internet protocol address are dynamic addresses.

10. The electronic device according to claim 9, wherein an Internet service provider (ISP) assigns the first Internet protocol address and the second Internet protocol address, and the communication module connects to the network and obtains the first Internet protocol address,
   wherein the communication module re-connects to the network and obtains the second Internet protocol address when internet connection with the network via the first Internet protocol address is disconnected.

11. The electronic device according to claim 8, wherein the processing unit controls the communication module to set up network configuration of the first network connection with the server when the processing unit receives a power-saving state signal,
   wherein the processing unit determines the predefined packet pattern and notifies the server of the predefined packet pattern associated with the electronic device, such that the server send the keep-alive packet according to the predefined packet pattern.

12. A remote connection keeping method for an electronic device comprising a communication module having a network chip and connecting to a network through the communication module, the remote connection keeping method comprising:
   entering a power-saving state from an operation state by the electronic device after establishing a first network connection between the electronic device and a server;
   continuously detecting a keep-alive packet sent from the server through the first network connection during a period of operating in the power-saving state; and
   returning to the operation state from the power-saving state in response to a wake-up signal to re-establish a second network connection between the electronic device and the server if an error of reception of the keep-alive packet occurs, wherein the wake-up signal is generated in response to the error of reception of the keep-alive packet occurs,
   wherein the error comprises a condition of not receiving the keep-alive packet that conforms to a predefined packet pattern set by the electronic device within a predetermined time, wherein the step of entering the power-saving state from the operation state after establishing the first network connection between the electronic device and the server comprises: setting up network configuration of the first network connection with the server when receiving a power-saving state signal;
   determining the predefined packet pattern and notifying the server of the predefined packet pattern associated with the electronic device, such that the server send the keep-alive packet according to the predefined packet pattern; and entering the power-saving state from the operation state.

13. An electronic device, comprising:
a communication module having a network chip configured for connecting to a network; and
a processing unit coupled to the communication module,
wherein after the communication module establishes a first network connection between the electronic device and a server, the processing unit controls the electronic device to enter a power-saving state from an operation state,
wherein during a period that the electronic device operates in the power-saving state, the communication module continuously detects a keep-alive packet sent from the server through the first network connection,
wherein if an error of reception of the keep-alive packet occurs, the processing unit controls the electronic device to return to the operation state from the power-saving state in response to a wake-up signal sent by the communication module, and the processing unit controls the communication module to re-establish a second network connection between the electronic device and the server, wherein the wake-up signal is generated in response to the error of reception of the keep-alive packet occurs,
wherein the error comprises a condition of not receiving the keep-alive packet that conforms to a predefined packet pattern set by the electronic device when a predetermined time expires,
wherein the processing unit controls the communication module to set up network wherein the processing unit determines the predefined packet pattern and notifies the server of the predefined packet pattern associated with the electronic device, such that the server send the keep-alive packet according to the predefined packet pattern.

\* \* \* \* \*